United States Patent [19]
Koch

[11] Patent Number: 5,755,211
[45] Date of Patent: May 26, 1998

[54] APPARATUS FOR OPERATING AN INTERNAL COMBUSTION ENGINE WITH VARIOUS FUELS

[75] Inventor: Achim Koch, Tegernheim, Germany

[73] Assignee: Siemens Aktiengesellschaft, Munich, Germany

[21] Appl. No.: 577,701

[22] Filed: Dec. 22, 1995

[30] Foreign Application Priority Data

Dec. 22, 1994 [DE] Germany ............... 44 46 069.4

[51] Int. Cl.$^6$ ....................................... F02M 21/02
[52] U.S. Cl. ............................... 123/525; 123/575
[58] Field of Search .................. 123/525, 526, 123/575, 27 GE, 304

[56] References Cited

U.S. PATENT DOCUMENTS

| | | | |
|---|---|---|---|
| 4,936,280 | 6/1990 | Langlois | 123/578 |
| 5,092,305 | 3/1992 | King | 123/27 GE |
| 5,228,423 | 7/1993 | Oikawa et al. | 123/525 |
| 5,370,097 | 12/1994 | Davis | 123/27 GE |
| 5,450,832 | 9/1995 | Graf | 123/525 |
| 5,526,797 | 6/1996 | Stokes | 123/525 |
| 5,549,083 | 8/1996 | Feuling | 123/525 |
| 5,592,924 | 1/1997 | Audisio et al. | 123/525 |

FOREIGN PATENT DOCUMENTS

| | | |
|---|---|---|
| 1214931 | 11/1966 | Germany. |
| 3129726 | 2/1982 | Germany. |
| 92/08888 | 5/1992 | WIPO. |

OTHER PUBLICATIONS

Japanese Patent Abstract No. 57110737 (Kouzaburou), dated Sep. 7, 1982.

*Primary Examiner*—Erick R. Solis
*Attorney, Agent, or Firm*—Herbert L. Lerner; Laurence A. Greenberg

[57] ABSTRACT

An apparatus for operating an internal combustion engine, in particular for driving a motor vehicle, alternatingly with two different types of fuel, includes two separate fuel circuits each being associated with a respective one of first and second different types of fuel. Each of the fuel circuits has at least one electrically triggerable metering device in the form of an injection valve. A switch device switches over from one of the fuel circuits to the other of the fuel circuits. A single electronic control unit controls both operation of the engine with the first type of fuel and operation of the engine with the second type of fuel. The electronic control has a power portion with end stages for triggering the injection valves. Each of the end stages is assigned both one injection valve for the first fuel type and one injection valve for the second fuel type.

7 Claims, 1 Drawing Sheet

APPARATUS FOR OPERATING AN INTERNAL COMBUSTION ENGINE WITH VARIOUS FUELS

BACKGROUND OF THE INVENTION

FIELD OF THE INVENTION

The invention relates to an apparatus for operating an internal combustion engine alternatingly with two different types of fuel, particular for driving a motor vehicle, including two separate fuel circuits associated with the different types of fuel, each fuel circuit having at least one electrically triggerable metering device, a switch device for switching over from one fuel circuit to the other fuel circuit, and a single electronic control unit controlling both operation of the engine with a first type of fuel and operation of the engine with a second type of fuel.

The use of alternative energies for operating an internal combustion engine, in particular an internal combustion engine for driving a motor vehicle, is gaining ever more importance, given the limited reserves of crude oil that exist and for the sake of meeting the legally prescribed, and even lower future, limit values for pollutant emissions.

One operation for at least partially replacing conventional fuel (gasoline) as driving energy for motor vehicles has proved to be operating motor vehicles with gas.

Of the types of gas available on the market, liquefied petroleum gas (LPG) and compressed natural gas (CNG) have proved to be especially suitable for that purpose.

Since those gases are free of lead and sulfur compounds and have very good combustion properties with excellent mixture formation and mixture distribution, the emissions of the pollutants CO, HC, $NO_x$ and $CO_2$ decrease as compared with motor vehicles equipped with gasoline-operated engines.

Since the gas supply network in most countries does not yet cover all areas, a combination of gas operation and conventional gasoline operation in the motor vehicle appears appropriate.

As a rule, in order to enable not only gasoline operation but also auto gas operation, the motor vehicle equipped in standard fashion with a device for gasoline operation is retrofitted for bivalent operation with an auto gas system. This requires not only the components necessary for storing, distributing and feeding the auto gas (among others, a gas tank with its fittings, lines, pressure transducers, injection system and reversing switch for selecting gas/gasoline operation) but also an additional electronic control unit with associated sensors and actuators that control the gas-operated mode.

It is also known to provide motor vehicles on a mass-production basis with internal combustion engines that can be operated with various fuels.

Published International Patent Application WO 92/08888 describes an internal combustion engine constructed for bivalent operation with gasoline as its first fuel and with liquid petroleum gas (LPG) as its second fuel. That system has separate tanks for each of the two fuels, and each tank communicates with its own fuel distributor strip through its own supply lines. A single set of injection valves is disposed at the fuel distributor strip, so that those injection valves meter not only the gasoline fuel but also the LPG fuel for the aspirated air. Excess fuel not injected by the injection valve is returned to its respective tank through return lines. Electromagnetic valves that are individually triggerable as a function of the particular type of fuel being used at the moment and automatically acting check valves assure that the excess fuel will be returned to the correct tank. The known configuration also has a conventional control unit that is intended, among other purposes, for determining the injection time in the gasoline-operated mode. It is followed by a further control unit for determining the injection time in the gas-operated mode. If the engine is being operated with gasoline, then the injection time is calculated in the usual way as a function of the engine load and rpm, and the injection pulses are passed on unchanged to the injection valves by the downstream control unit for the gas mode.

Conversely, if the engine is operated with auto gas, then the injection times calculated by the electronic control unit for the gasoline mode are corrected in the downstream control unit for the gas mode and only then passed on in the form of injection pulses to the injection valves, which then inject auto gas. Such a correction of the injection times calculated for the gasoline mode is necessary, since to attain an ignitable fuel-air mixture for the engine combustion chambers and to stay within a specified range of the air ratio for the sake of limiting the proportion of pollutants in the engine exhaust gas, the properties of the fuel being injected, namely the auto gas, must be taken into account.

Although using the same injection valves for both types of fuel does provide an economical, space-saving device, nevertheless the structural layout of the valves can only be a compromise, in view of the various properties of the fuels to be injected (such as different pressure and density). Moreover, if a single set of injection valves is used for both types of fuel, problems can arise during the transition from one fuel to the other. Another disadvantage is that separate control units are necessary for the different types of fuel.

SUMMARY OF THE INVENTION

It is accordingly an object of the invention to provide an apparatus for operating an internal combustion engine with various fuels, which overcomes the hereinafore-mentioned disadvantages of the heretofore-known apparatuses of this general type, in which a switchover between operating modes with different types of fuel is assured in a simple way with high operating reliability and which moreover permits a motor vehicle equipped with such an engine to be easily retrofitted.

With the foregoing and other objects in view there is provided, in accordance with the invention, an apparatus for operating an internal combustion engine alternatingly with two different types of fuel, comprising two separate fuel circuits each being associated with a respective one of first and second different types of fuel, each of the fuel circuits having at least one electrically triggerable metering device in the form of an injection valve of an internal combustion engine; a switch device connected to the injection valves for switching over from one of the fuel circuits to the other of the fuel circuits; and a single electronic control unit connected to the injection valves and to the switch device for controlling both operation of the engine with the first type of fuel and operation of the engine with the second type of fuel, the electronic control having a power portion with end stages for triggering the injection valves, and each of the end stages being assigned both one injection valve for the first fuel type and one injection valve for the second fuel type.

In accordance with another feature of the invention, the switch device includes an electrical reversing switch and a selector switch supplying an output signal actuating the electrical reversing switch for switching over a supply voltage between the injection valves for the first fuel type and the injection valves for the second fuel type.

In accordance with a further feature of the invention, the reversing switch is a relay with a switchover member.

In accordance with an added feature of the invention, the first type of fuel is gasoline and the second type of fuel is liquid gas.

In accordance with an additional feature of the invention, the first type of fuel is gasoline and the second type of fuel is compressed natural gas.

In accordance with yet another feature of the invention, the switchover between operation with the first type of fuel and with the second type of fuel and vice versa is initiated manually.

In accordance with a concomitant feature of the invention, the switchover between operation with the first type of fuel and with the second type of fuel and vice versa is effected automatically, if a respective supply of one of the fuels has reached a minimum allowable level.

Other features which are considered as characteristic for the invention are set forth in the appended claims.

Although the invention is illustrated and described herein as embodied in an apparatus for operating an internal combustion engine with various fuels, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The figure of the drawing is a diagrammatic and schematic view showing only those parts of a motor vehicle and an internal combustion engine that are necessary for comprehension of the invention.

DESCRIPTION OF THE PREFERRED EMBODIMENTS

Figure 1:
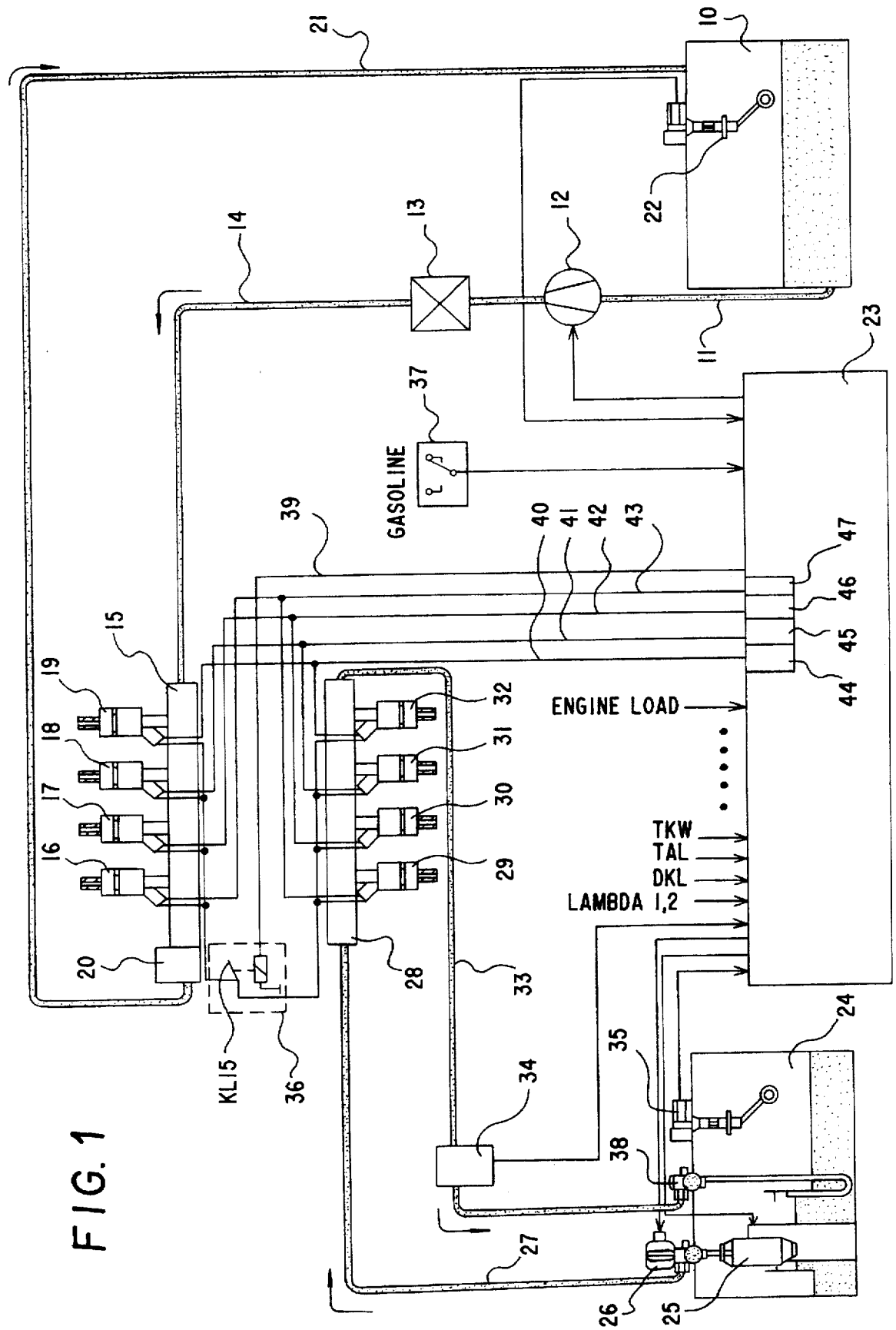

Referring now in detail to the single figure of the drawing, it is seen that reference numeral 10 indicates a gasoline tank, from which a suction line 11 leads to an electrically operated gasoline pump 12. This electrical fuel pump which, for example, is a roller-cell pump, is activatable by a signal from an electronic control unit 23 and can also be disposed directly in the gasoline tank 10. The fuel pump 12 generates the necessary injection pressure and feeds gasoline through a gasoline filter 13 and a feed line 14 to a distributor strip 15 near an intake tube of an engine. A pressure controller 20 is disposed at an end of the distributor strip 15 and keeps a differential pressure across a metering gap of injection valves constant regardless of the quantity of fuel being injected. As a result, the injection quantity of fuel is determined solely by the opening duration of the injection valve. Electromagnetic injection valves 16, 17, 18, 19, corresponding in number to the number of cylinders of the engine, are disposed in a known manner at the distributor strip 15. Excess gasoline that is not injected by the injection valves reaches the gasoline tank 10 again through a return line 21. A fill level sensor 22 outputs a signal corresponding to the fill level of the gasoline tank 10, to the electronic control unit 23 for further processing.

In addition to the gasoline tank 10, a gas tank 24 is provided in the motor vehicle for receiving and storing liquid auto gas (LPG). Through the use of an electric pump 25 and a shutoff valve 26, which is open during the gas-operated mode of the engine, the LPG, which is under pressure, is forced through a feed line 27 to a gas distributor strip 28. Electromagnetic injection valves 29, 30, 31, 32 which are provided at this distributor strip 28, again correspond in number to the number of cylinders of the engine. As a result of opening of these injection valves, the liquefied auto gas expands and is injected as gaseous fuel into the intake tube. Excess fuel again reaches the gas tank 24 through a return line 33, a pressure transducer 34, and a check valve 38.

A fill level sensor 35 outputs a signal corresponding to the fill level of the gas tank 24, to the electronic control unit 23 for further processing. Outputs of a plurality of sensors and transducers, of which only a few output signals have been shown in the drawing, are also applied to the electronic control unit 23. These are signals from lambda sensors disposed upstream and downstream of an exhaust gas catalytic converter lambda 1, 2, a throttle valve sensor DKL, temperature sensors TAL for aspirated air and TKW for coolant temperature, and engine load sensors (for the air flow rate, intake tube pressure and rpm, for example).

A gasoline/gas selector switch 37 disposed on an instrument panel of the motor vehicle makes it possible to choose between gasoline or gas operation of the engine and is likewise electrically connected to the control unit 23.

Depending on the position of this gasoline/gas selector switch 37, either the injection valves 16, 17, 18, 19 for gasoline operation or the injection valves 29, 30, 31, 32 for gas operation can be activated. A switchover of a voltage supply between the two sets of injection valves is performed through an electrically actuatable reversing switch 36, which is preferably constructed as a relay with a switchover member. One end of a relay coil winding is applied to ground, while another end leads through a control line 39 to the electronic control unit 23, where it is connected to an output of the gasoline/gas selector switch 37. An input terminal of a switchover member of the relay 36 is connected to a terminal KL 15 (terminal output ignition/driving switch), so that as a function of the position of the gasoline/gas selector switch 37, the terminal 15 either connects through a supply voltage for the injection valves to all of the injection valves 29, 30, 31, 32 for the gas operation or to all of the injection valves 16, 17, 18, 19 for the gasoline operation.

The individual triggering of the various injection valves for the operating mode of gasoline or gas selected through the use of the gasoline/gas selector switch 37, is effected from the electronic control unit 23 through a ground clocking. This is done through trigger lines 40, 41, 42, 43, with each trigger line being connected both to one terminal of an injection valve for gasoline operation and to one terminal of an injection valve for gas operation. As a result, it becomes possible to use one and the same end stage for both triggering an injection valve for gasoline operation and for triggering an injection valve for gas operation. An end stage 44 thus triggers the injection valve 30 over the trigger line 40 in the gas-operated mode of the engine, while conversely it triggers the injection valve 19 in the gasoline mode.

Therefore, despite the possibility of sequential triggering of all eight injection valves, only four end stages are needed.

However, a switchover from the gasoline to the gas mode or vice versa can be initiated not only as a function of the driver's request through the use of the gasoline/gas selector switch, but it can also be carried out automatically, if one of the two tanks 10, 24 has reached a minimum allowable fill level. To that end, the signals of the two fill level sensors 22, 35 are evaluated by the electronic control unit 23, and regardless of the instantaneous position of the gasoline/gas selection switch, a switchover is made to whichever is the other fuel at that time. An ensuing actuation of the gasoline/gas selector switch 37 then has no further influence on the choice of the operating mode of the engine, until the corresponding fill level sensor again signals a fill level that is above the minimum allowable level. Since a single control unit 23 that is used to control the engine can be operated in alternation with different fuel, not only do the injection valves need to be switched over upon a change of operating mode, because of the different properties of the two types of fuels, but certain functions and/or data in the electronic control unit 23 must also be switched over.

If a switchover is made from gasoline to gas operation, then the following aspects must be taken into account:

- upon starting enrichment, in the gas mode, shorter injection times are necessary because of the absent or only very slightly present wall film;
- in after-starting enrichment/warmup enrichment, lesser enrichments are needed in the gas mode;
- for the fundamental performance graphs for calculating the injection time, different basic data must be stored in memory for the gas mode, because of the structurally different injection valves;
- if gas is used as the fuel, the required enrichments/leaning down are much slighter in non-steady-state operation;
- because of different flash conditions, different ignition times are necessary in the gas mode; moreover, gas has a research octane number RON of over 100, or in other words earlier ignition times are possible in full-load operation;
- in lambda control, different control parameters must be utilized;
- tank venting of the gasoline system must continue even during the gas-operated mode, but can proceed in a reduced quantity, so that no heated gasoline travels through the return from the gasoline distributor strip; and
- in the gas-operated mode, no preinjection is necessary.

Upon a switchover from the gasoline to the gas mode, the fuel supply pump of the other tank must also be turned on initially, so that the pressure in the fuel distributor strip is built up. Only then are the injection valves switched over. In this process, the lambda control must be interrupted briefly, to avoid trimming the control as a result of brief lambda deviations.

Upon the switchover from the gas mode to gasoline operation, the first injection pulse in gasoline operation must be increased by a corresponding wall film quantity, dependent on the particular engine load point. This avoids an overly lean gasoline/air mixture and prevents any possible engine misfiring.

The invention has been described in terms of an exemplary embodiment in which in addition to the gasoline-operated mode, the gas-operated mode with liquefied petroleum gas (LPG) is possible. However, instead of gas operation with the liquid gas LPG, a bivalent mode with gasoline and compressed natural gas (CNG) is also possible. This requires a different structural layout of the injection valves, which must be adapted to the properties of the particular gas being used. Moreover, the configuration according to the invention and the method can also be used for internal combustion engines that each have only one injection valve (single point injection) for the gasoline-operated mode and the gas-operated mode.

I claim:

1. An apparatus for operating an internal combustion engine alternatingly with two different types of fuel, comprising:

two separate fuel circuits each being associated with a respective one of first and second different types of fuel, each of said fuel circuits having at least one electrically triggerable metering device in the form of an injection valve of an internal combustion engine;

a switch device connected to said injection valves for switching over from one of said fuel circuits to the other of said fuel circuits;

a single electronic control unit connected to said injection valves and to said switch device for controlling both operation of the engine with the first type of fuel and operation of the engine with the second type of fuel, said electronic control having a power portion with end stages for triggering said injection valves, and each of said end stages being assigned both one injection valve for the first fuel type and one injection valve for the second fuel type; and said electronic control unit changing a timing of the triggering of said injection valves when changing the operation of the engine from the first fuel type to the second fuel type to compensate for differences in the fuel types.

2. The apparatus according to claim 1, wherein said switch device includes an electrical reversing switch and a selector switch supplying an output signal actuating said electrical reversing switch for switching over a supply voltage between said injection valves for the first fuel type and said injection valves for the second fuel type.

3. The apparatus according to claim 2, wherein said reversing switch is a relay with a switchover member.

4. The apparatus according to claim 1, wherein the first type of fuel is gasoline and the second type of fuel is liquid gas.

5. The apparatus according to claim 1, wherein the first type of fuel is gasoline and the second type of fuel is compressed natural gas.

6. The apparatus according to claim 1, wherein the switchover between operation with the first type of fuel and with the second type of fuel and vice versa is initiated manually.

7. The apparatus according to claim 1, wherein the switchover between operation with the first type of fuel and with the second type of fuel and vice versa is effected automatically, if a respective supply of one of the fuels has reached a minimum allowable level.

* * * * *